United States Patent
Wand et al.

(10) Patent No.: US 8,046,405 B2
(45) Date of Patent: Oct. 25, 2011

(54) SYSTEM AND METHOD FOR WEB-BASED IMAGING SERVICES WITHIN A CLIENT-BASED APPLICATION

(75) Inventors: Andrew Martin Wand, Newcastle, WA (US); Jeffrey Alan Kohler, Bellevue, WA (US); Alexander Sabo Brodie, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 2406 days.

(21) Appl. No.: 10/268,263

(22) Filed: Oct. 10, 2002

(65) Prior Publication Data
US 2004/0049536 A1 Mar. 11, 2004

Related U.S. Application Data

(60) Provisional application No. 60/408,678, filed on Sep. 5, 2002.

(51) Int. Cl.
*G06F 15/16* (2006.01)
(52) U.S. Cl. .................. 709/203; 709/201; 709/202
(58) Field of Classification Search .................. 709/203, 709/201, 202
See application file for complete search history.

(56) References Cited

U.S. PATENT DOCUMENTS

| 6,910,049 B2* | 6/2005 | Fenton et al. ................ 1/1 |
| 2002/0013830 A1* | 1/2002 | Stuckman et al. ............ 709/219 |
| 2004/0004663 A1* | 1/2004 | Kahn et al. ................. 348/207.1 |

* cited by examiner

*Primary Examiner* — John Follansbee
*Assistant Examiner* — Dhairya A Patel
(74) *Attorney, Agent, or Firm* — Shook Hardy & Bacon

(57) ABSTRACT

This invention is directed to a computer-implemented system and method for providing web-based features in a client-based digital imaging application. An area of the registry is provided for a number of possible, future web-based features. The registry has the capacity to accept a number of name-value pairs that define a web-based imaging feature. When a web-based feature is to be added, the name-value pairs that define the web-based imaging feature are added to the registry. After a feature has been added, it is displayed for selection by a user. Upon selection of the web-based imaging feature, image data about a selected one or more images is recorded in a known location. The web-based service that is providing the web-based imaging feature is granted access to the image data in the known location. The image data in the known location is then deleted when the web-based imaging feature is closed.

24 Claims, 9 Drawing Sheets

| Information | Value | Type | Sample Value Data |
|---|---|---|---|
| Feature Title | CommandLabel | String | Save to MSN Photos |
| Feature Instructions (first pane) | Instructions1 | String | What do you want to save? |
| Feature Instructions (second pane) | Instructions2 | String | Follow the instructions on the right to save your pictures. When you have finished, click Done. |
| ID to identify task to redirector | ID | DWORD | 1152 |
| File type to save picture as | FileType | String | JPG |
| Max width to save pictures at | MaxWidth | DWORD | 0x708(1080) |
| Max height to save pictures at | MaxHeight | DWORD | 0x4B0(1200) |
| Task icon (.bmp) | LogoFileName | String | SaveMSN.bmp |

FIG. 3.

| | Value |
|---|---|
| Registry Key | |
| CommandLabel | Save to MSN Photos |
| Instructions1 | What do you want to save? |
| Instructions2 | Follow the instructions on the right to save your pictures. When you have finished, click Done. |
| ID | dword:0000047F |
| FileType | jpg |
| MaxWidth | dword: 0x800 (2048) |
| MaxHeight | dword: 0x800 (2048) |
| LogoFileName | SaveMSN.bmp |

200

218 — Registry Key
220 — CommandLabel
220 — Instructions1
222 — Instructions2
226 — ID
224 — FileType
228 — MaxWidth
— MaxHeight
236 — LogoFileName

FIG. 4.

SYSTEM AND METHOD FOR WEB-BASED IMAGING SERVICES WITHIN A CLIENT-BASED APPLICATION

CROSS-REFERENCE TO RELATED APPLICATIONS

This application claims the benefit of Provisional Application Serial No. 60/408,678, filed Sep. 5, 2002.

STATEMENT REGARDING FEDERALLY SPONSORED RESEARCH OR DEVELOPMENT

Not Applicable.

TECHNICAL FIELD

The present invention relates generally to computer digital imaging technology, and, more particularly, to a system and method for enabling expandable web (server-based) imaging services within a client-based application.

BACKGROUND OF THE INVENTION

Digitally represented still images are now commonly stored in a computer environment, such as a personal computer. The stored images can then be manipulated, printed, and indexed by the PC user. Software packages are available to aid the PC user in handling these digital images. Such software packages include numerous capabilities, including archiving the images, printing the images in various sizes and formats, and other editing capabilities, such as the ability to rotate an image, crop it, correct its brightness, contrast and tint. In addition, such software packages typically include the ability to cut portions out of one image and incorporate them into other images. These software packages are typically provided to the consumer via a piece of removable, computer-readable media, such as a compact disk or CD.

It has also become desirable to provide to the PC user a number of web-based imaging services. These web-based imaging services generally involve taking an image existing on the user's PC and sending it to a remote location on the World Wide Web, through the Internet. The remote location then provides some type of service related to the image. Examples of web-based imaging services include remote storage, professional printing and photo gift creation. Other web-based services are available and the services change and evolve over time. The imaging software packages provided via CD are typically revised only periodically. For example, the software provider may revise the imaging software packages only once per year. When a revision is made, the software provider updates, tests, and then releases the code to the consumers. In between software revisions, the software provider lacks the ability to add new web-based features to the software packages. In addition, when the software provider adds a web-based feature to the current software package, it must write new code for each feature. In other words, the code is not transferable from feature to feature. As with any software product, code addition is somewhat risky. To alleviate this risk, if new code is added, the software provider must test the code to ensure that the code addition does not cause problems elsewhere within the software.

It can therefore be seen that the current software imaging products and the system for updating this software involve several disadvantages. First, the software packages lack structure that allows updates as new web-based features are available, or as existing web-based features change. Second, the software packages require new code for each web-based feature. Third, code addition involves the risk of introducing error into the existing and already tested software package. A new client-based software imaging application is needed that can incorporate web-based features even after the software application has been released. A software package is needed that has structure allowing addition of features without introducing significant code changes and the resulting risk of error. Finally, the software package needs to allow addition of the web-based features in a way that involves a more uniform protocol from feature to feature.

BRIEF SUMMARY OF THE INVENTION

This invention is directed to a computer-implemented system and method for providing web-based features in a client-based digital imaging application. One or more web-based features are provided in the registry via a number of name-value pairs that define each web-based imaging feature. When another web-based feature is to be added, the name-value pairs that define the additional web-based imaging feature are added to the registry. After a feature has been added, it is displayed for selection by a user. Upon selection of the web-based imaging feature, image data about a selected one or more images is recorded in a known location. The web-based service that is providing the web-based imaging feature is granted access to the image data in the known location. The user can then further interact with the web-based service to obtain further processing of the images, such as ordering prints or photo gifts relating to the image data. The image data in the known location is then deleted when the web-based imaging feature is closed.

Additional advantages and novel features of the invention will be set forth in the description which follows, and in part will become apparent to those skilled in the art upon examination of the following, or may be learned from practice of the invention.

BRIEF DESCRIPTION OF THE SEVERAL VIEWS OF THE DRAWING

These and other objectives and advantages of the present invention will be more readily apparent from the following detailed description of the drawings of the preferred embodiment of the invention that are herein incorporated by reference and in which:

FIG. 3 is a table showing information about registry additions;

FIG. 4 is a subset of FIG. 4 as a registry addition for a web-based feature;

DETAILED DESCRIPTION OF THE INVENTION

The present invention provides a method and software package for use in the handling of digital images stored in a computing device. The software package allows the addition of web-based or server-based imaging services after release of the software to the user community. These web-based imaging services may be added using a uniform protocol without introducing significant code changes.

Having briefly described an embodiment of the present invention, an exemplary operating environment for the present invention is described below.

Exemplary Operating Environment

Figure 1:
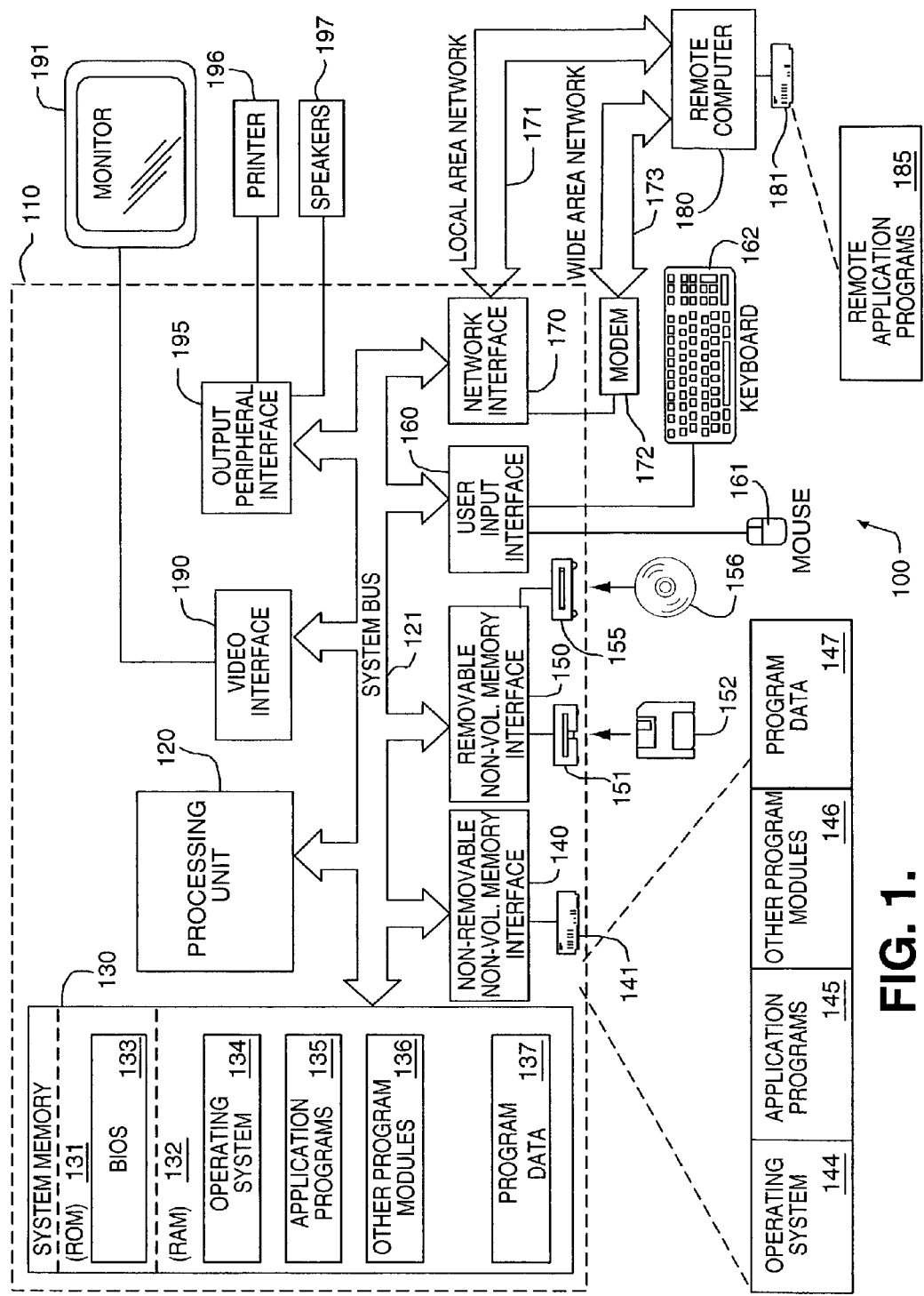
FIG. 1 is a block diagram of a computing system environment suitable for use in implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or non-volatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Incorporation of Web-Based Features

The client-based application of the present invention is used to handle digital images on a user's PC. While the software embodiment is described as stored on a CD, it should be understood that the software is provided to the PC user and is installed on the client PC. It should be understood that other methods of accomplishing this installation are also within the scope of this invention. The user loads the digital images onto the PC through any of a variety of methods, such as by the use of a scanner or directly from a digital camera. Once loaded, the software package allows a user to process and manipulate the images.

The client-based application of the present invention allows web-based features to be added to the application at any point in time, including after the product has been purchased by the user and loaded onto their PC. While discussed as "web-based" features, it should be understood that the principles apply not only to web-based features, but to any server based features as well. These web-based features all involve the basic functions of accessing and loading a digital image from the user's PC and delivering it through the Internet to a web-based service. The web-based service will then perform some type of processing desired by the user. These web-based services include, for example, the ability to order professionally printed images, photo gifts, and other image-based products, as well as the ability to save images to a storage site on the web, and to share images with others.

Figure 2:
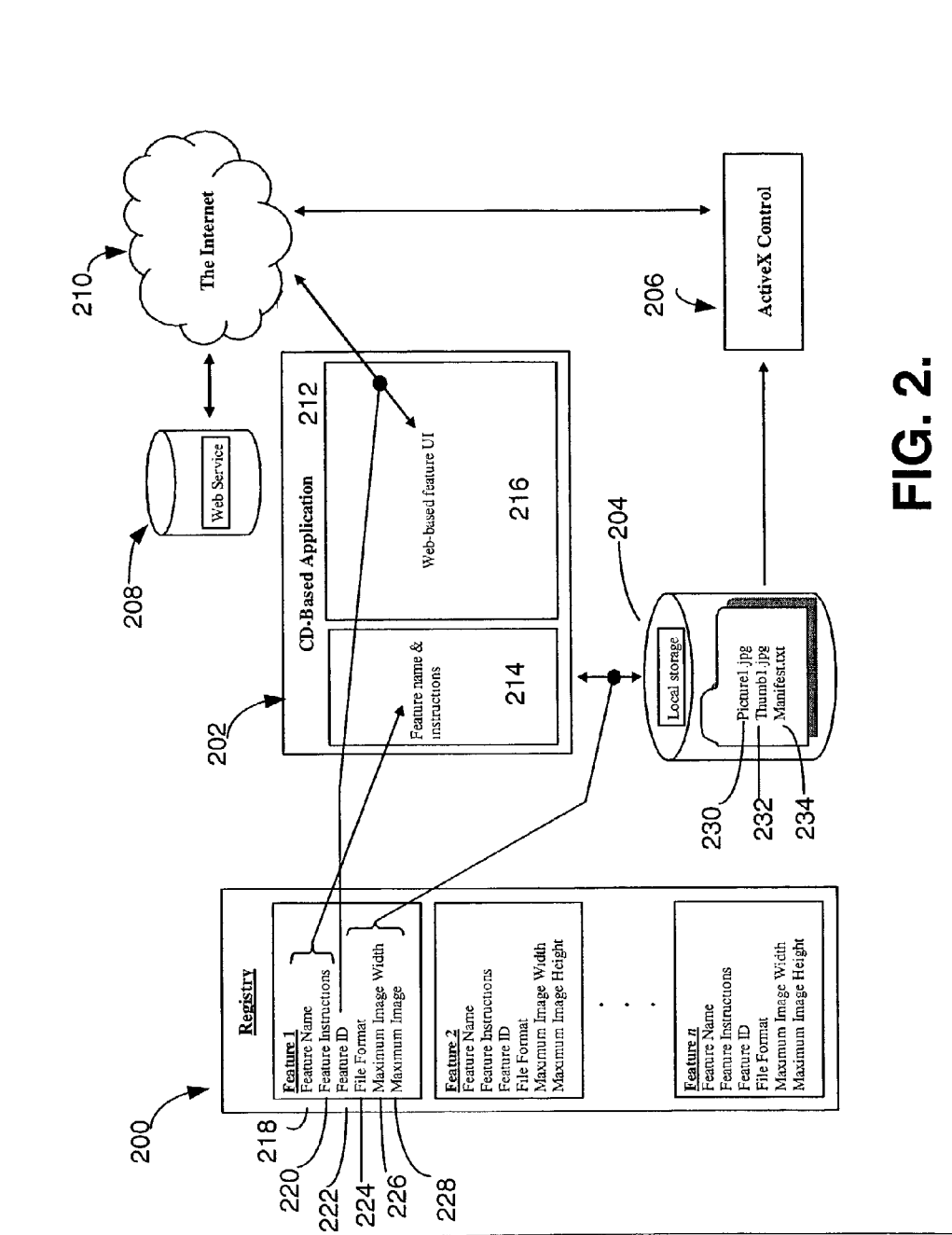
FIG. 2 is a schematic representation of the basic components of the present invention.

A client-based application incorporating the basic features of the present invention is shown schematically in FIG. 2. A number of basic components interact to provide the full functionality allowed by the application. At a very basic level, the invention uses a registry 200, a client-based imaging application 202, a local storage area 204, and an ActiveX control 206. These components exist on the local PC of the user. The application 202 interacts with a web service 208 through a network 210, such as the Internet to allow the user to access the web-based features. Each of these components and their interaction will be described in more detail below.

The client-based application 202 includes known editing and manipulating capabilities similar to those existing in the prior art. An exemplary client-based application is the PICTURE IT software application available from the Microsoft Corporation of Redmond, Wash. A schematic representation of the user interface for such an imaging application is broadly represented in FIG. 2 as 212. The user interface typically includes a task area 214 and an image viewing area 216. The task area 214 displays options available to the user for image manipulation. The viewing area 216 displays the image.

In the present invention, when a web-based feature is available to the user, the feature appears as an option to the user in the task area 214. The addition of a web-based feature is discussed below. Any web-based features known at the release of client-based application 202 are pre-loaded onto application 202. The web-based features are stored as a series of name-value pairs in the registry 200. These name-value pairs include a feature name 218, one or more feature instructions 220, a feature ID 222, a file format type 224, a maximum allowable image width 226, and a maximum allowable image height 228.

If a web-based feature is known at the time of the client-based application 202 release, its information is added to the registry 200 prior to shipping. Later, features can be added to the registry using the same format as the existing task infrastructure name-value pairs 218-228 in the registry 200. In other words, the registry has room for additional name-value pairs 218-228 discussed above. A feature is added to the client-based application 202 by updating the registry 200. In other words, the name-value pairs 218-228 corresponding to the added feature are added to the registry. After a feature has been added to the registry 200, it will be displayed as an available feature in the file menu when the user next launches the client-based application 202.

When the user accesses a web-based feature, the user selects the images for which further processing is desired. The client-based application 202 then saves certain information regarding these selected images to local storage 204. More specifically, client-based application 202 will save to the local storage folder 204 the selected images 230, a thumbnail 232 for each image, and a textual manifest 234. The web service 208 then provides its own user interface in the space 216 to the user. The web service 208 uses the ActiveX control 206 to access information about the selected images that exists in the manifest 234 and displays thumbnails by accessing pointers to the thumbnails 232 in storage 204. Once the user indicates to the web service 208 those images that need further processing, the web service 208 accesses the images 230 through ActiveX control 206 and uploads them through the Internet 210 to its service for processing.

Having generally described the broad components and process utilizing those components, a more detailed description follows. FIG. 3 outlines four columns, one relates to the basic information, followed by a column indicating the value in the registry, the type of value sought, and a sample value data entry. As described above, the registry keys include the feature name 218. This feature name 218 is associated with a value called COMMANDLABEL that is a string. Sample data for the feature name 218 is "Save to MSN Photos." FIG. 3 illustrates two rows of instructions 220. These instructions relate to a first pane and a second pane of instructions. Each involves a string. Sample data for the first pane instructions is shown as "What do you want to save?" Sample data for the second pane instructions is "Follow the instructions on the right to save your pictures. When you have finished, click done." The next row illustrated in FIG. 3 is the feature ID 222 that involves a value labeled ID, which is a DWORD type. Sample data might be "1152." This ID is used by a redirector feature. The redirector functions as a substitute to provide a direct URL for the web service. In other words, the ID value "1152" is provided to a redirector. The redirector uses this value to ascertain the URL of the web service 208. By using the redirector, if the URL of the web service 208 changes, the change is noted at the redirector site, rather than changing the registry value on the user's computer. The redirector also acts as the gatekeeper. If a web page or service 208 is to be up and running, the provider of the Client-based application 202 must be informed so that a correct mapping for the feature ID to the URL of the web service 208 can be provided.

Returning to FIG. 3, the next row of information involves the file format 224. This involves a value called "filetype" which is a string. Sample data might be "JPG." The file type is merely the type of file that the web service 208 expects from the user. Other exemplary file types include ".JPG", ".TIFF", and ".PNG". Of course, other file types could be indicated here by the web service 208. The information to be included in the registry also includes the maximum allowable image width and height, 226 and 228, respectively. These involve the values of MAXWIDTH and MAXHEIGHT which are both of the type DWORD. Sample data for these, respectively, would be "0X708" and "0X4B0". This allows a web service 208 to specify the biggest image size it can handle. This prevents the user from uploading something that is unnecessarily large. But the Client-based application 202 will not increase the resolution of an actual image to match the values 226 and 228. Finally, a task icon item 236 may be provided that has a value LOGOFILENAME, which is a string. Sample data might be "savemsn.bmp". The task icon is used when the icon or other graphical representation is to be used in conjunction with the feature name 218.

A sample registry entry for a feature allowing the user to save images to a storage site is shown in FIG. 4. FIG. 4 shows the information that would be added to the registry under the value column when this feature is added after the Client-based application 202 shipped to the user. Typically, the additions to the registry shown in FIG. 4 can be achieved through a small, downloadable, executable, or even a simple registry file.

Figure 5:
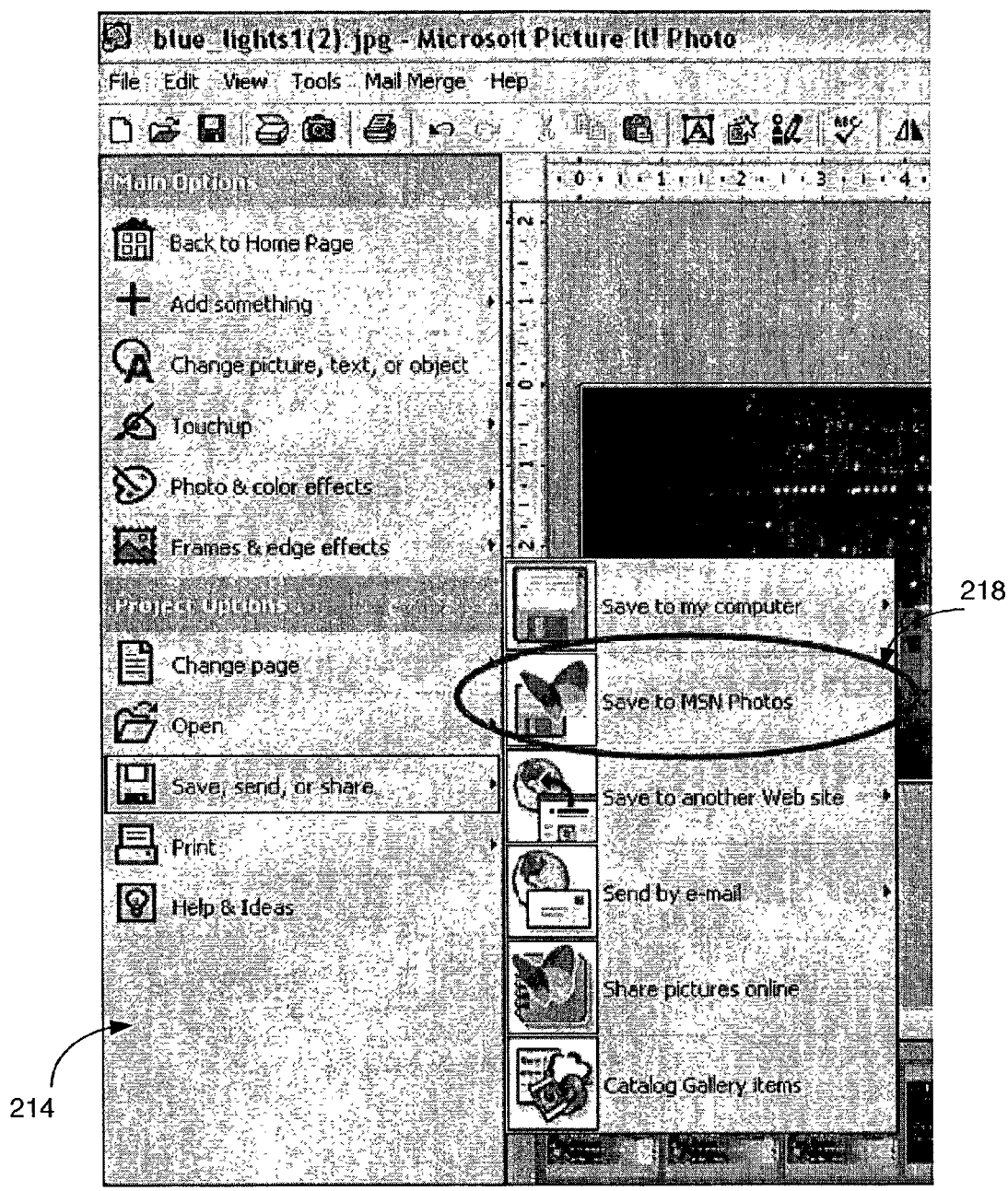
FIG. 5 is an exemplary screen shot of an available web-based feature selection.
Figure 6:
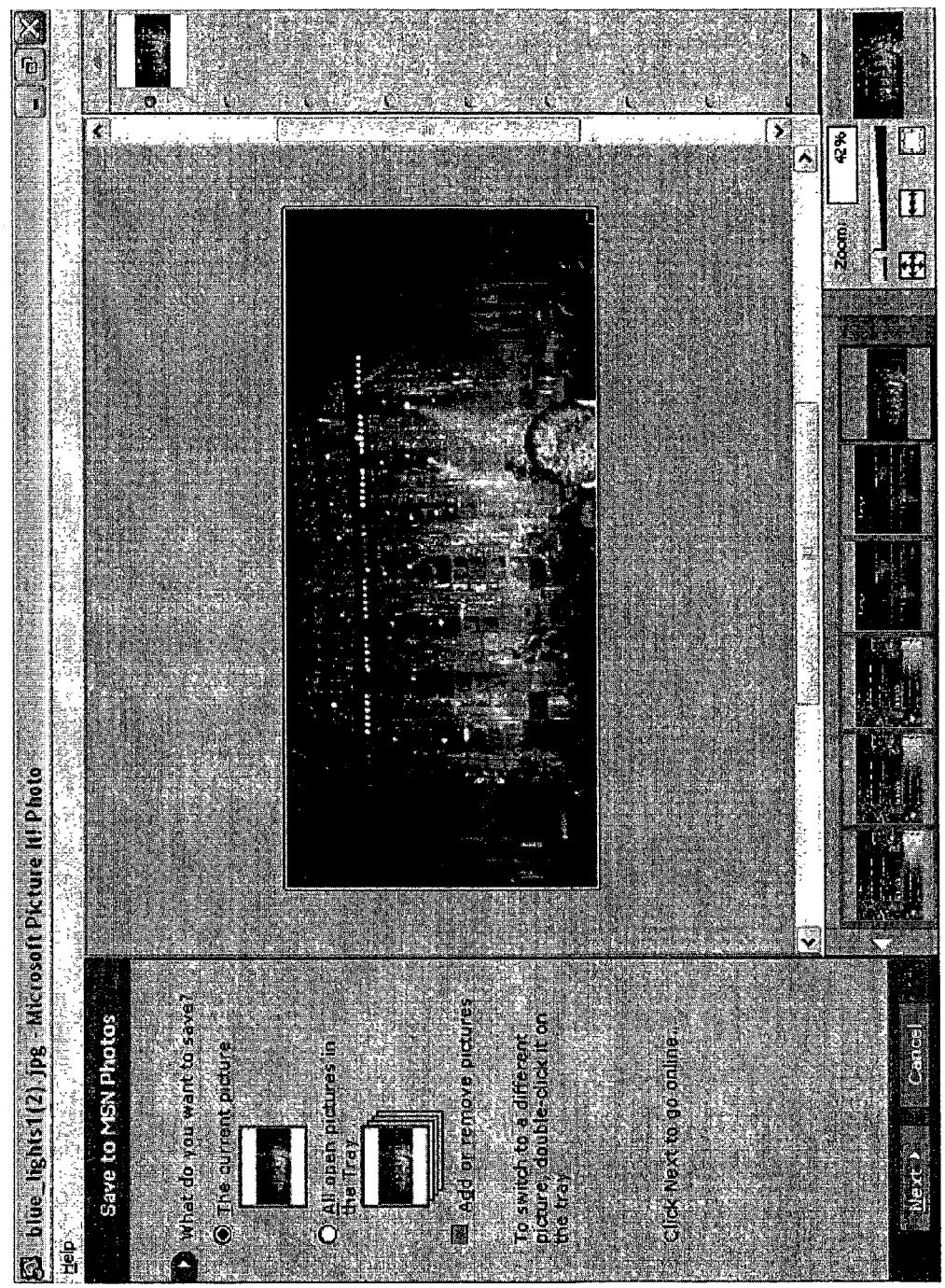
FIG. 6 is an exemplary screen shot allowing a user to select the images exposed to the web-service.

A more detailed explanation of the workings of the present invention is described below with reference to FIGS. 5 through 9. As best seen in FIG. 5, when a web-based feature is added to the registry 200, the feature name 218 is presented to the user in area 214 of the client-based application user interface. In this example, the web-based feature "Save to MSN Photos" is presented to the user under the "Save, send, or share" project option. Once the user indicates the desire to use this feature, the user can be presented with a screen allowing the user to indicate the appropriate images, as seen in FIG. 6. The instruction for the first pane 220 "What do you want to save?" is obtained from the instruction value data 220 in the registry. After the user provides the information requested in FIG. 6, the client-based application 202 performs a number of steps. First, for each of the selected images, the client-based application 202 will write the image file 230 into the local storage folder 204. The local storage folder 204 is at a known location. This is specific to the client-based application 202 and is not available to other applications and is hidden from the user. The images 230 are saved in the file format indicated by the file format registry value 224. Therefore, in this example, the file type indicated for registry value 224 was ".JPG" as shown in FIG. 4. Second, the client-based application will also write a thumbnail 232 for each image 230 into the folder 204. The thumbnails 232 are always ".JPG" files. Third, the client-based application 202 will write a text file 234 to the local storage 204. The text file 234 contains information about the images, such as the names of the images, the size, and format of the images, as well as pointers to the thumbnails for the images.

Figure 7:
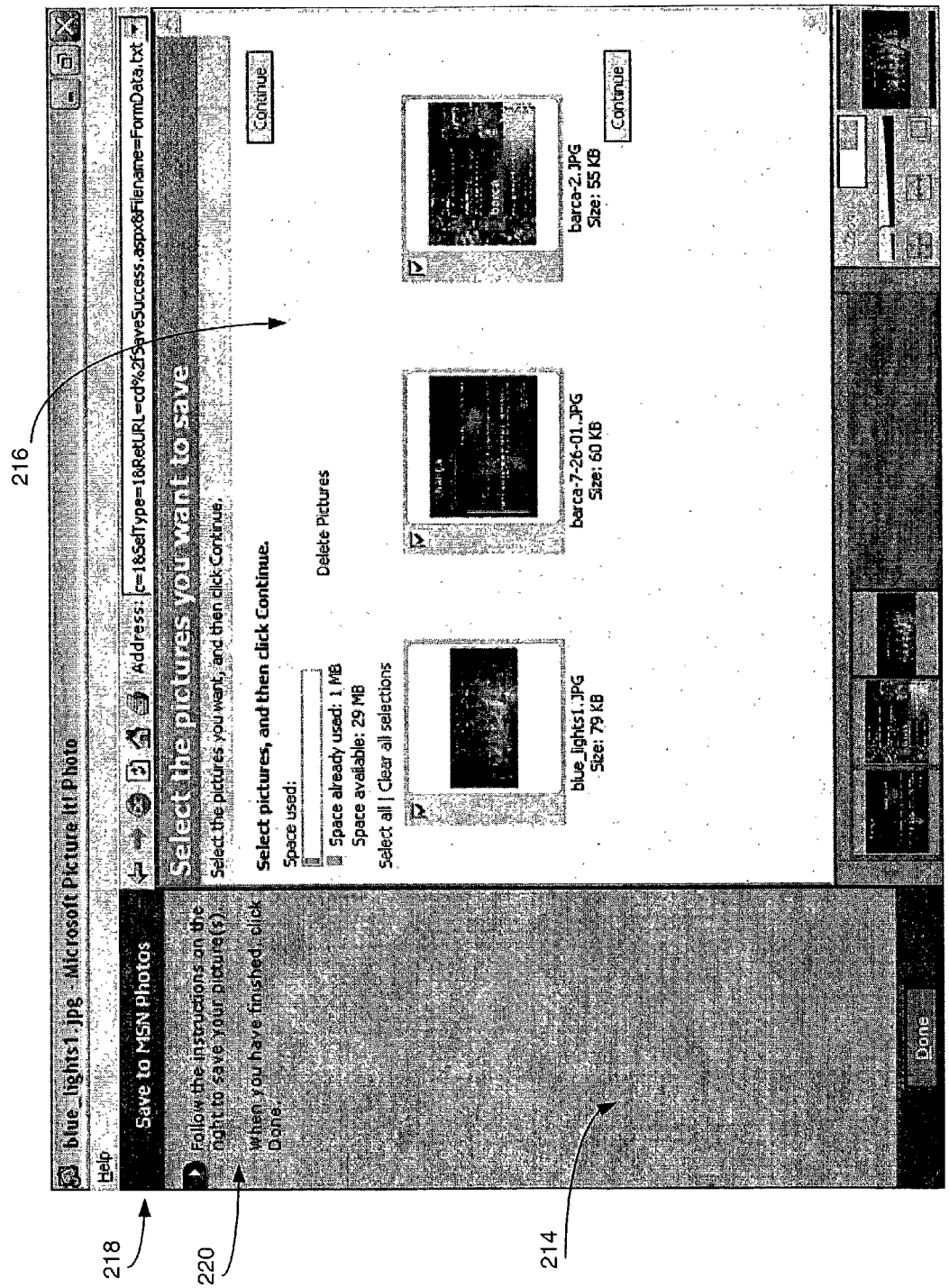
FIG. 7 is an exemplary screen shot allowing a user to select the images to upload to the web-service.

The client-based application 202 will also launch the web-based feature in the area 216 of the user interface. Upon launch of the web-based feature, the feature ID 222 is used by the redirector, which navigates to the web service 208. The web service 208 provides the feature-specific user interface in the area 216. As part of this launch, the user's connection to the Internet 210 may be checked. The user may also be taken though some type of authentication process by the web service 208 to identify the user to the web service 208. For example, the PASSPORT service used by the Microsoft Corporation of Redmond, Wash. may be used to authenticate the user. As best seen in FIG. 7, the user interface area 214 may be populated with the feature instructions 220 for the second pane, which are obtained from the registry 200. For example, the instructions may direct the user to follow the instructions in the area 216 of the user interface and to click done when the user is finished.

It is important to note that the user interface existing within area 216 at this point is provided by the web service 208. As an example, the web service 208 can present to the user thumbnails of the selected images to confirm which images the user desires to store through the web service 208. In doing so, the web service 208 uses the ActiveX control 206 on client-based application 202 to access the local storage folder 204. Again, the local storage folder 204 is populated when the user selects pictures or images for processing by a web-based feature. The ActiveX control 206 grants the web service 208 access to the image data within folder 204. When the web service 208 is instantiated, it calls the ActiveX control 206 to determine which files are available for further processing. The manifest 234 in folder 204 is used to inform the web service 208 which files are available for further processing. More specifically, the web service 208 sends down a page that will instruct the ActiveX control 206 to post all the data in manifest 234 to a web site chosen by web service 208. Web service 208 can then process this data on the server and send an appropriate web page back to the client-based application 202 in area 216. The manifest 234 also contains pointers to the thumbnails so that the web service 208 can render the thumbnails 232 of the images 230 without uploading the thumbnails 232 to the web service 208. The web page then builds the appropriate user interface displaying the thumbnails 232 as shown in FIG. 7. As shown in FIG. 7, the user is given the option to select one or more of the thumbnail images for further processing. Once selected, the actual images 230 are uploaded to the web service 208. To upload the images 230 to the web service 208, the ActiveX control 206 is used to gain access to the images 230. The ActiveX control 206 thus allows the web service 208 to specify what data to upload and when. Importantly, the only files available for upload to the web service 208 are those contained in folder 204.

Figure 8:
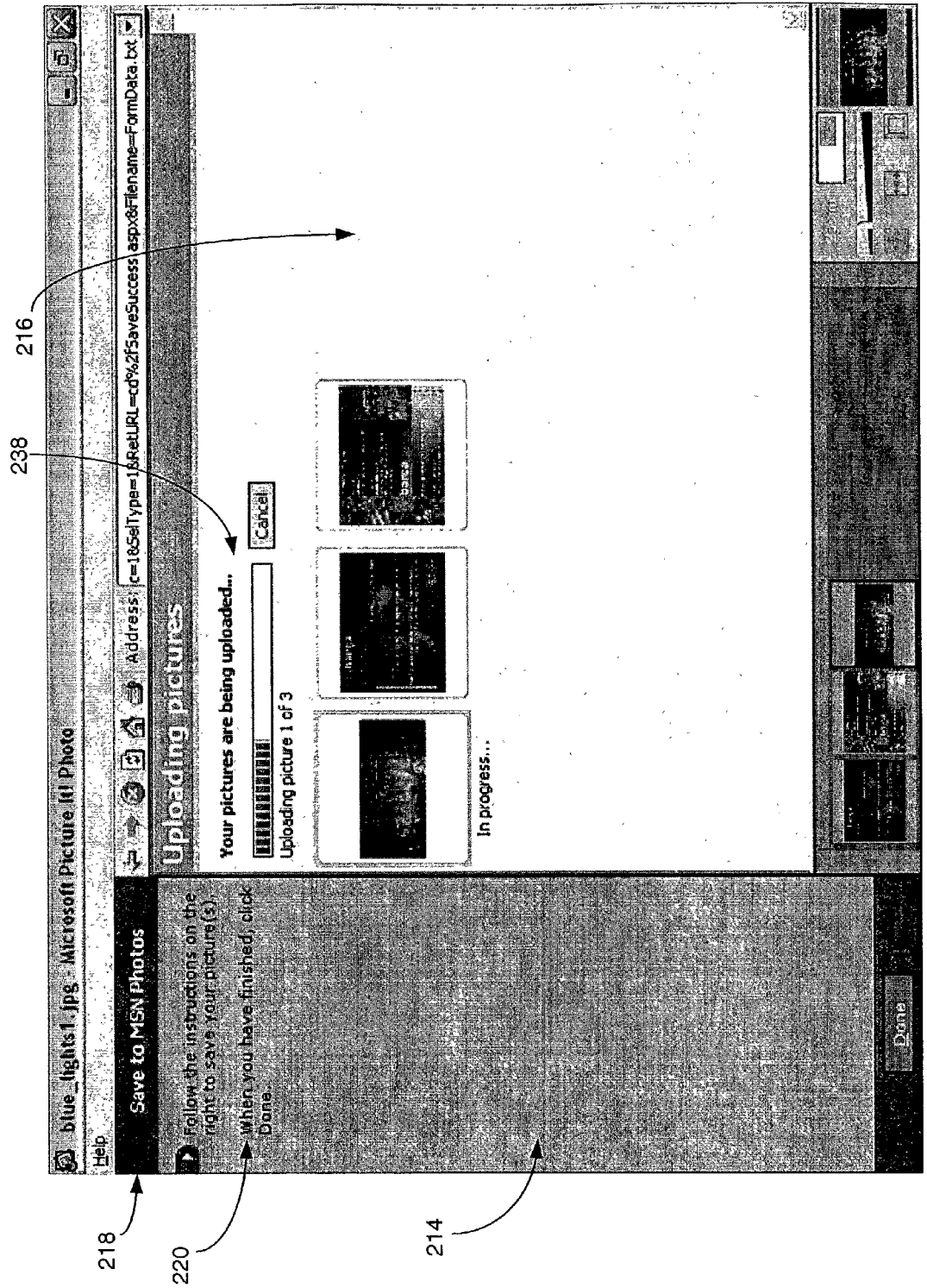
FIG. 8 is an exemplary screen shot indicating that images are being uploaded and showing a progress indicator.
Figure 9:
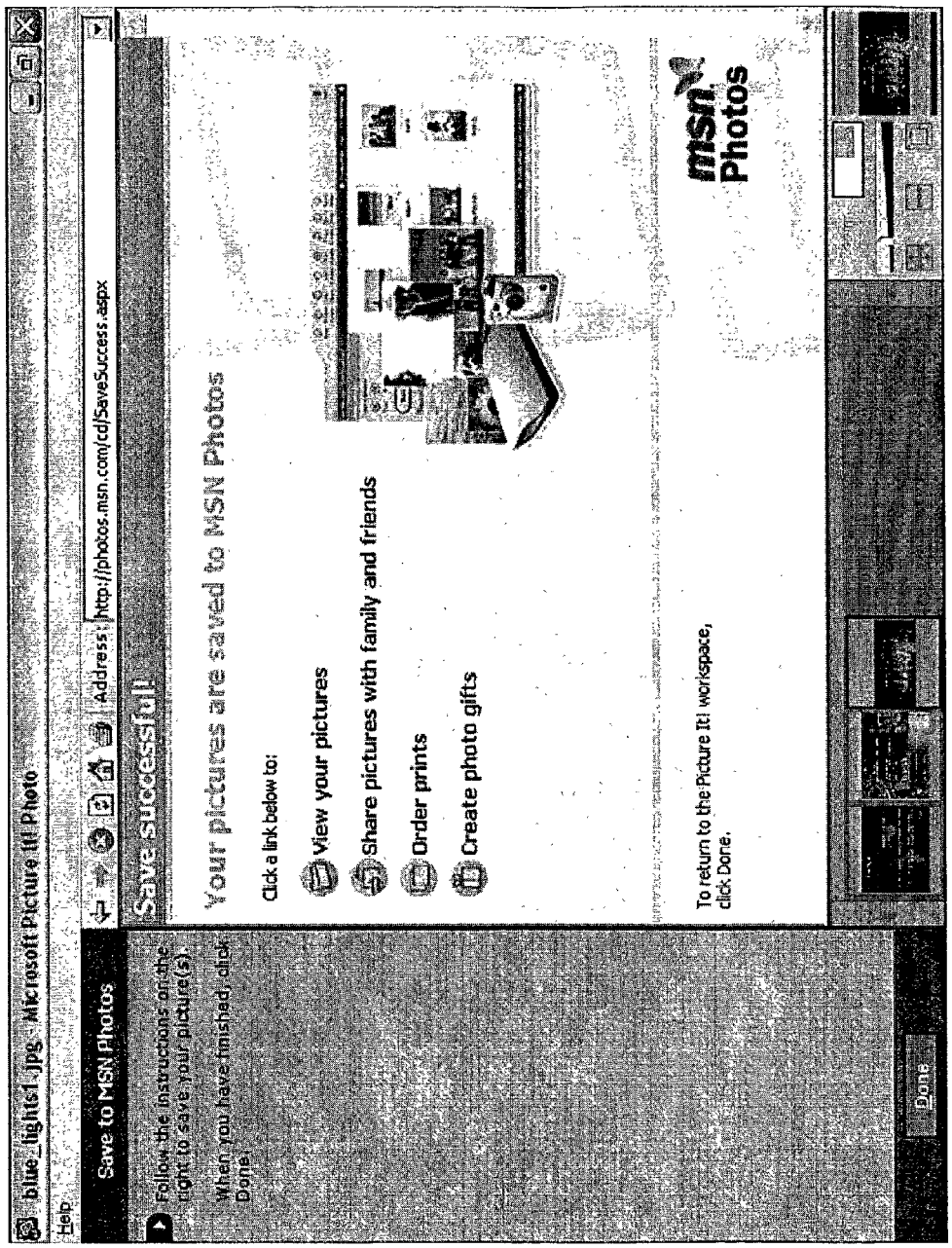
FIG. 9 is an exemplary screen shot indicating that the images have been successfully uploaded.

As seen in FIG. 8, once selected, the user is given an indication 238 that the images are being uploaded. Each image that is uploaded can be sent as a separate request. If the connection between the client-based application 202 and the web service 208 is lost, only the current image transfer is affected. All images already uploaded are safely at web service 208. The ActiveX control 206 also allows the web service 208 to display to the user this progress indicator 236. The web service 208 can specify to the ActiveX control 206 the frequency at which the progress report is provided. For example, progress can be indicated as 25%, 50%, 75%, and done, or can be indicated in increments of 10%. After the images have been successfully processed, the user may be shown a screen by the web service 208 indicating that the processing was successfully completed. An example of this user interface is shown in FIG. 9. It should be understood that many other events can take place in this process, depending on the web-based feature being used. When the user has completed the use of the feature, they can indicate that in area 214 of the user interface. For example, the user can click the "done" control in the lower left area. When the feature processing is completed, the contents of folder 204 are deleted. In other words, the contents of folder 204 exist only from the time of feature launch to the time of feature exit. This ensures that the image data will be used by a web-based service 208 only when desired by a user.

In summary, a web-based feature is made available to users when its information is in the registry. When a user selects a task that uses a web-based feature, this launches a generic upload task and passes in an ID for the specific feature. The task then looks in the registry according to the ID and reads the registry to indicate how the web-based feature is to configure itself. The user then indicates which images are desired for further processing. At this point, the Client-based application 202 creates the contents of the folder 204, including the images, thumbnails, and the text manifest. The web-based feature then is informed about the indicated images through use of the ActiveX control 206 and displays the locally-stored thumbnails. After the web service 208 has confirmed the images that the user desires for further processing, the web service 208 uses the ActiveX control 206 to upload the actual image 230. The user then navigates through the remainder of the steps provided by the web service 208 in the user interface area 216 to finish the desired processing. After the user is done, the web-based feature is closed and the contents of the folder 204 are deleted.

If additional web-based features 208 become desirable, the registry is updated with information similar to that noted in FIG. 4. After the registry is updated, the availability of the web-based feature is presented to the user on the next launch of the client-based application 202.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and within the scope of the claims.

What is claimed is:

1. A computer-implemented method for providing server-based features in a client-based digital imaging application, comprising:
    identifying a registry on the client having one or more name-value pair sets that define one or more server-based imaging features, each server-based imaging feature comprising functionality provided by one or more servers to the client-based digital imaging application;
    updating the registry by adding one or more new name-value pair sets defining one or more new server-based imaging features; and
    upon launching the client-based digital imaging application, determining available server-based features defined in the registry and making available all defined server-based imaging features for selection by a user.

2. The computer-implemented method of claim 1, further comprising, upon selection of a server-based imaging feature, determining configuration parameters for the selected server-based imaging feature based on the definition in the registry.

3. The computer-implemented method of claim 2, further comprising, obtaining, from the user, a list of items on which the server-based feature is to perform an operation.

4. The computer-implemented method of claim 3, further comprising, creating an item container on the client and populating the item container with information about each item in the obtained item list.

5. The computer-implemented method of claim 4, further comprising, granting access to the information on the client to the server-based feature.

6. The computer-implemented method of claim 5, further comprising, deleting the information from the item container when the server-based imaging feature is closed.

7. The computer-implemented method of claim 5, wherein the server based feature is only granted access to the item container.

8. The computer-implemented method of claim 5, wherein the access is granted and managed by a control.

9. The computer-implemented method of claim 4, wherein the items in the item list are digital images.

10. The computer-implemented method of claim 9, wherein the information populated to the item container includes, for each digital image, a digital image file, a pointer to a thumbnail image for the digital image file, and textual information about the digital image and the thumbnail pointer.

11. The computer-implemented method of claim 9, wherein the configuration parameters include a feature title, one or more feature instructions, and the desired image format.

12. A computer storage medium, the computer storage medium not being a signal, containing instructions for executing the method of claim 1.

13. A computer system having a processor, a memory and an operating environment, the computer system operable to execute the method as recited in claim 1.

14. A computer storage medium, the computer storage medium not being a signal, containing instructions for providing server-based features in a client-based digital imaging application, said instructions comprising:
    accessing a registry having one or more name-value pair sets that define one or more server-based imaging features, each server-based imaging feature comprising functionality provided by one or more servers to the client-based digital imaging applications;
    updating the registry by adding one or more new name-value pair sets defining one or more new server-based imaging features; and
    determining available server-based features defined in the registry and making available all defined server-based imaging features for selection by a user.

15. The computer storage medium of claim 14 the computer storage medium not being a signal, said instructions further comprising:
    determining configuration parameters for a selected server-based imaging feature from the name-value pair set defining the selected server-based imaging feature.

16. The computer storage medium of claim 15, the computer storage medium not being a signal, said instructions further comprising:
    accepting, from the user, a list of images on which the server-based feature is to perform an operation.

17. The computer storage medium of claim 16, the computer storage medium not being a signal, said instructions further comprising:
    creating an item container at a known location and populating the item container with information about each image in the accepted item list.

18. The computer storage medium of claim 17, the computer storage medium not being a signal, said instructions further comprising:
    granting access to only the information in the item container to the server-based feature.

19. The computer storage medium of claim 17, the computer storage medium not being a signal, said instructions further comprising:
    deleting the information from the item container at a specified time.

20. A computer storage medium, the computer storage medium not being a signal, containing a data structure for defining a server-based imaging feature, comprising:
    a registry comprising at least one name-value pair set including configuration parameters for a corresponding server-based imaging feature, the server-based imaging feature comprising functionality provided by one or more servers to the client-based digital imaging application, wherein the registry is configured to be updated by receiving one or more new name-value pair sets defining one or more new server-based imaging features, each of the one or more new server-based imaging features comprising functionality provided by one or more servers to the client-based digital imaging application.

21. The computer storage medium containing a data structure of claim 20, the computer storage medium not being a signal, wherein the configuration parameters comprise at least a feature name, one or more feature instructions and a file format type.

22. A computer-implemented method for providing server-based features to a client-based digital imaging application, comprising:

providing to a client one or more name-value pair sets that define one or more server-based imaging features including configuration parameters for each server-based imaging feature, wherein each server-based imaging feature comprises functionality provided by a server to the client-based digital imaging application, and wherein the client stores the one or more name-value pair sets in a registry on the client, and further wherein when the client-based digital imaging application is launched, the one or more server-based imaging features are added to a current list of server-based imaging features available to a user.

23. The computer-implemented method of claim 22, further comprising, accepting, from the client, a list of items on which a provided server-based feature is to perform an operation.

24. The computer-implemented method of claim 23, further comprising, accessing information on the client about each item in the accepted item list.

* * * * *